Patented July 15, 1924.

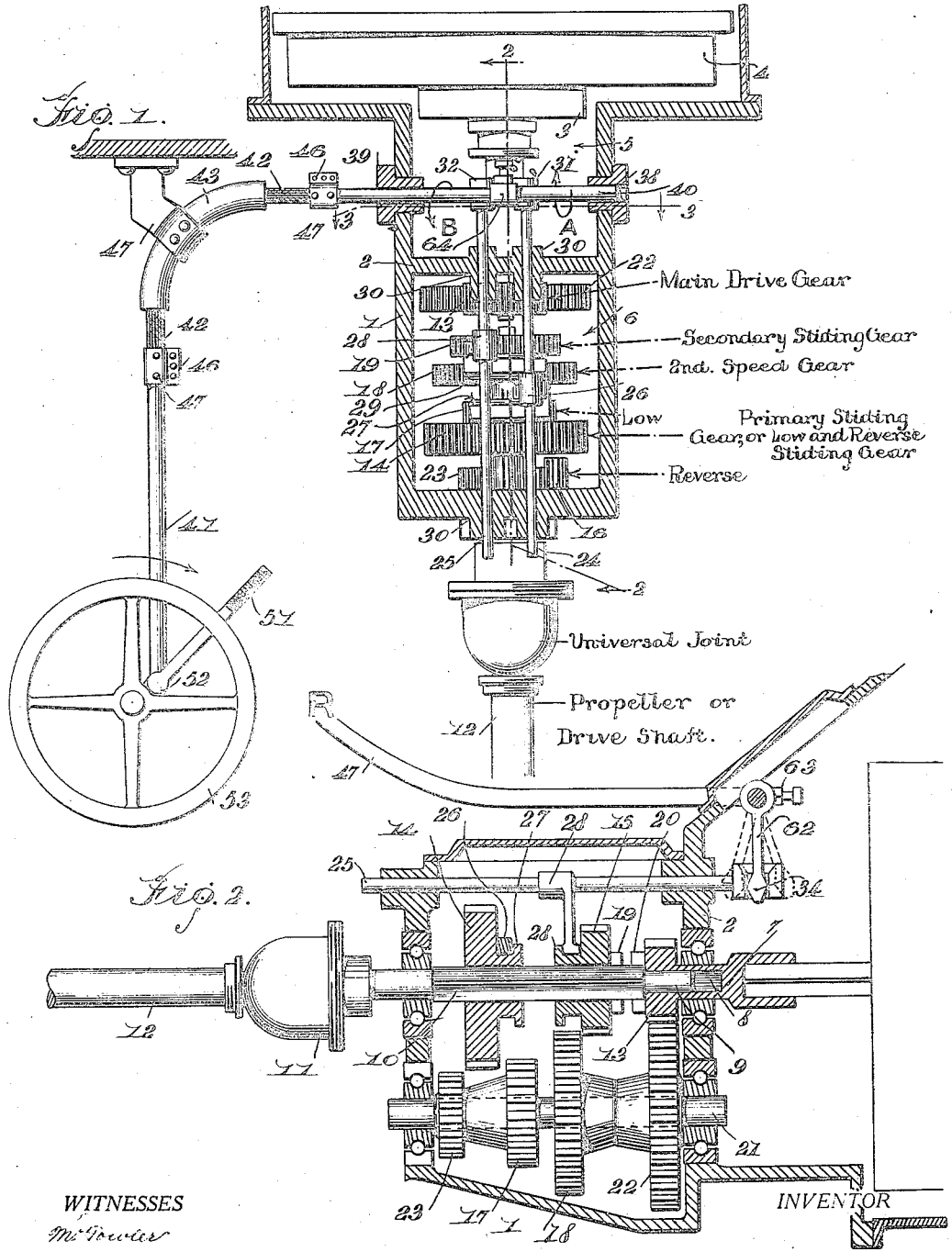

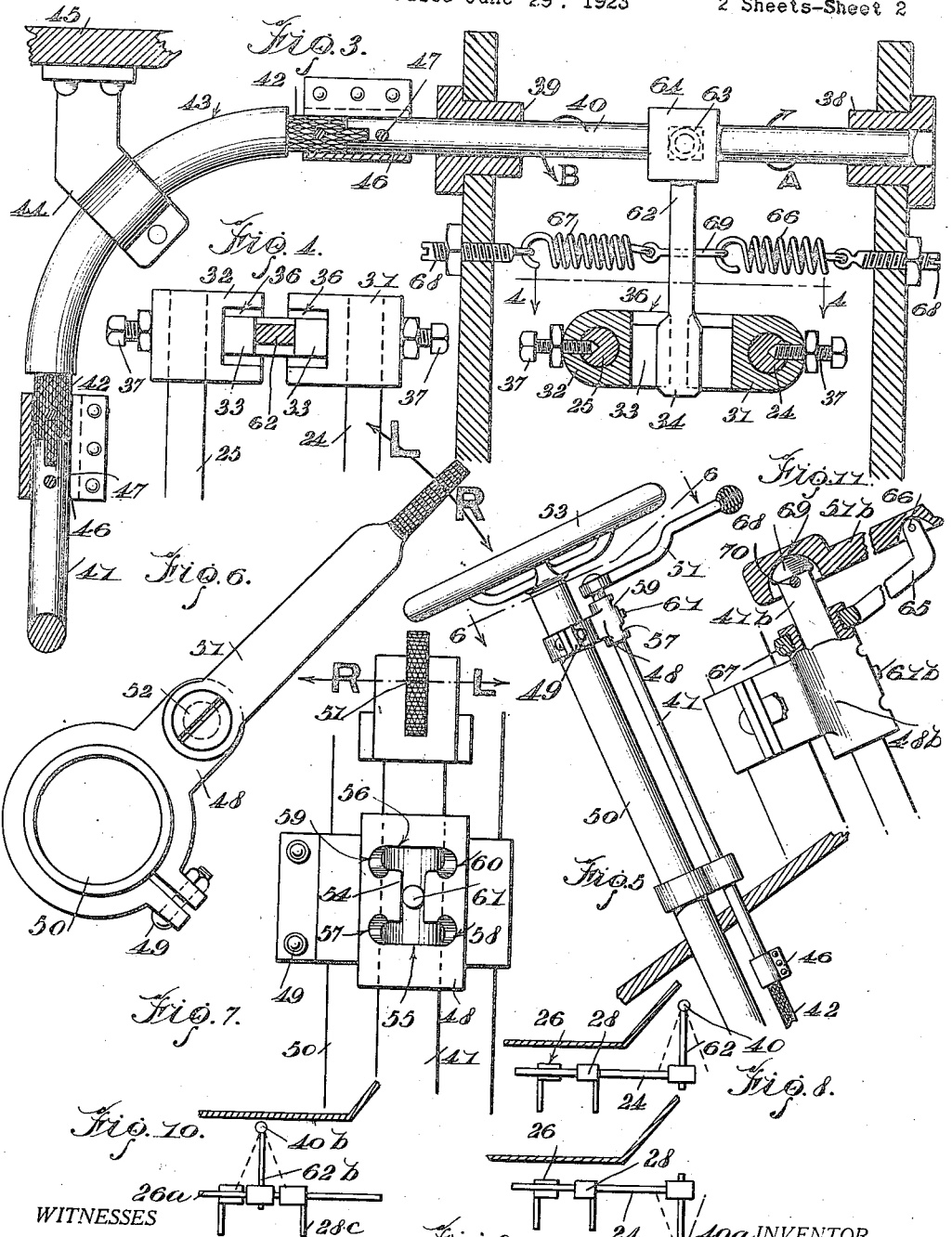

1,501,353

UNITED STATES PATENT OFFICE.

JAMES CLARENCE McDOWELL, OF PUNTA RASSA, FLORIDA.

GEAR CONTROLLER.

Application filed June 29, 1923. Serial No. 648,592.

*To all whom it may concern:*

Be it known that I, JAMES CLARENCE MC-DOWELL, a citizen of the United States, and a resident of Punta Rassa, in the county of Lee and State of Florida, have invented certain new and useful Improvements in Gear Controllers, of which the following is a specification.

My invention relates to improvements in gear changing controllers adaptable to mechanical assemblies of numerous kinds including automobiles, trucks, tractors and motor vehicles of various descriptions, and it consists of the constructions, combinations and arrangements herein described and claimed.

An object of the invention is to provide an improved controller for changing the gears in the transmission mechanism of a motor vehicle so as to obtain the various speeds.

A further object of the invention is to provide a controller which may be operated by a shifting lever situated preferably adjacent to the steering wheel, somewhat on the order of the common throttle and spark levers, so that the operator may have said lever ready at hand and the necessity for obstructing the floor of the car at the right of the driver's seat where the shifting lever is generally located, is obviated.

A further object of the invention is to provide a gear controller having a shifting lever preferably situated as described, which lever is adapted to be moved either up or down or sidewise, in order to obtain the various speed changes in the transmission mechanism.

Other objects and advantages will appear in the following specification, reference being had to the accompanying drawings, in which:—

Fig. 1 is a horizontal section through a portion of a transmission case showing how the improved gear controller is connected with the primary and secondary shifting rods, Fig. 2 is a detail longitudinal section of the transmission case taken substantially on the line 2—2 of Fig. 1, again showing the mode of application of the gear controller to the shifting rods, Fig. 3 is a cross section on the line 3—3 of Fig. 1 showing more of the gear controller (the invention per se) in detail, Fig. 4 is a detail horizontal section taken on the line 4—4 of Fig. 3, showing how the selecting arm is situated in respect to the primary and secondary shifting rod shoulders, Fig. 5 is a detail side elevation of the steering post illustrating the accessibility of the shifting lever, Fig. 6 is a detail horizontal section taken on the line 6—6 of Fig. 5, Fig. 7 is a front elevation of the selecting rod guide and steering post clamp, Fig. 8 is a detail diagram illustrating the mode of application of the selecting arm according to the arrangement in the preceding views, Fig. 9 is another diagram showing the position of the selecting arm reversed in the clutch housing, Fig. 10 is another diagram illustrating the selecting arm situated in the gear or transmission case, and Fig. 11 is a detail sectional view of a modification wherein the shifting lever is provided with a pivotal support.

The invention resides both in the particular construction of the gear controller per se and in its combination with the primary and secondary shifting rods of transmission mechanism whether these be of motor vehicles or machines of other descriptions. The gear controller is intended primarily for use on motor vehicles, and the drawings illustrate the application thereof to a conventional type of transmission mechanism. It is necessary to illustrate and describe this in order that the reader may be able to understand the application of the invention.

The transmission mechanism comprises a case 1 in which the various shiftable gears are situated. There is a wall 2 across this casing, at the front of which is situated the clutch 3, fly wheel 4, etc. Refer to Fig. 1: The top of the drawing looks toward the front of the motor vehicle, the bottom toward the rear axle. In Fig. 2, the right of the drawing looks toward the front, the left toward the rear. The reader can readily understand this because the fly wheel 4 is a part of the engine and the engine is situated at the front. The space 5 at the front of the partition 2 is called the clutch housing. The space 6 is called the gear housing.

The engine shaft 7 has a socket 8 to receive the circular spindle 9 of the transmission shaft 10. This shaft is square in cross section. That part which extends out of the case 1 at the rear carries the universal joint 11 through which connection with the propeller or drive shaft 12 is made. The engine shaft 7 carries the main driving gear 13. This gear rotates continuously while the engine is running. None of the other gears shown in Figs. 1 and 2 impart any driving power to the shaft 12 when the parts are in the neutral position shown in Fig. 2.

Mounted on the transmission shaft 10 are the primary sliding gear 14 and the secondary sliding gear 15. The first is slidable to engage either the reversing idler 16 (Fig. 1) or the low speed gear 17 (Fig. 2). The second gear 15 is slidable to engage the second or intermediate gear 18. When slid in the opposite direction (see Fig. 2) the dogs 19 and 20 (respectively on the gear 15 and main drive gear 13) are adapted to engage and the full power of the engine shaft 7 is conveyed directly through the transmission shaft 10 to the drive shaft 12. It is true that the other gears, 17 and 18, for example, will revolve, but this makes no difference.

These gears are fixed upon a countershaft 21. The main driving gear 13 has constant engagement with the countershaft drive gear 22, and it is by this means that the countershaft and gears thereon are continuously rotated as stated. The countershaft 21 also carries a countershaft reverse gear 23 with which the reversing idler 16 meshes.

Situated above the transmission shaft 10 is a pair of shifting rods 24 and 25, respectively designated the primary and secondary shifting rod for purposes of distinction, the primary rod 24 carries a fork 26 which has engagement with a collar 27 on the primary gear 14. The rod 25 has a fork 28 which has engagement with a collar 29 on the secondary sliding gear 15. The shifting rods are slidable in bearings 30 on the end walls of the transmission case, the front ends of these rods extending into the clutch housing 5. All which has been described up to this point is common construction.

The improved gear controller makes necessary the provision of a pair of shifting rod shoulders 31 and 32. There is one of these shoulders on each of the shifting rods as shown in Figs. 1, 3 and 4. Each of the shoulders is forked at 33 so as to make room for the head 34 (Fig. 2) of the selecting arm 62. The upper edges of the forks 33 are beveled at 36 so as to readily permit the selecting arm 62 to move to its various dotted line positions (Fig. 2) without binding. The shifting rod shoulders are fixed in position by set screws 37.

Situated in bearing bushings 38 and 39 above the shifting rods 24 and 25 is the lower member 40 of a selecting rod which includes the upper member 41 and a flexible elbow 42 by means of which the two members are joined. The flexible elbow is necessary where a bend occurs in the selecting rod. Should it so happen that more than one bend is necessary before the transmission case is reached, it would be an obvious expedient to add a sufficient number of flexible elbows to make the various bends.

The elbow 42 runs through a tubular guide 43 which is supported by a clamp 44 on a suitable support 45. Couplings 46 clamp the ends of the flexible elbow and the lower and upper members 40 and 41 together at the places where they meet. Pins 47 are also made use of so as to make these couplings more secure.

The upper selecting rod member 41 passes through a guide 48 which is clamped at 49 to the steering post 50. A lever 51 is suitably secured at 52 to the upper end of the selecting rod 41. This lever is situated conveniently below the steering wheel 53 so as to be accessible to the hand of the driver. In this respect the shifting lever 51 is like the throttle and spark levers on certain motor vehicles.

The guide 48 (Fig. 7) has an H-slot composed of the longitudinal portion 54 and branches 55 and 56. These respective branches terminate in pin recesses 57, 58 and 59, 60. The selecting rod 41 carries a pin 61 which is adapted to be moved into any one of the recesses.

When the pin 61 stands in the middle of the slot 54 (Fig. 7) the shifting rods 24 and 25 are in such positions that the primary and secondary sliding gears 14 and 15 are in neutral positions. A downward pressure on the lever 51 causes the selecting rod 40 to move toward the right (Figs. 1 and 3). An upward pull on the lever 51 will cause the rod 40 to move to the left. A turn of the lever 51 to the right, assuming the pin 61 to be situated in either branch 55 or 56, will cause the selecting rod 40 to turn under away from the observer in the direction of the arrow A (Figs. 1 and 3). A turn to the left of the lever 51 will cause the selecting rod 40 to rotate under toward the observer in the direction of the arrow B (Figs. 1 and 3). To obtain the first (low) or reverse drives, the lever 51 must be pushed down so that the pin 61 may move in the branch 55. For second (intermediate) and third (high) speeds, the lever 51 must be pulled up so that the pin 61 may move in the branch 56. All this changing of gears (which the changing of speeds naturally implies) is done by the selecting arm 62. This arm is fastened at 63 to the selecting shaft 40, and is situated in the clutch housing 5. The arm has a sleeve 64 by means of which it is applied to the selecting rod 40. The arm hangs down and occupies the space between the fork 33 of the shoulders 31 and 32 (Figs. 3 and 4). Here the arm has a somewhat enlarged head 34 which adds to the strength of the arm where it is adapted to contact the sides of the forks.

Balance springs 66 and 67 are intended for the purpose of keeping the arm 62 in a central position in respect to the shoulders 31 and 32 when the parts are in a neutral position. The outer ends of these springs are attached to screws 68 which may be adjusted and locked in the adjusted positions. These springs cause the arm to return to the neutral position. The inner ends of the springs are attached to a spring hook 69 which is affixed to the selecting arm in any suitable manner.

The operation may be sub-divided into as many subjects as there are gear changes which the improved controller is capable of producing. The reader will remember that all of the gear changes are made by the hand of the operator. By virtue of the shifting lever 51 being situated on the steering post and within convenient reach from the steering wheel 53, the gear shifting lever which is customarily located on the floor in front of the front seat of the motor vehicle is done away with entirely.

For first or low speed: Assume the selecting pin 61 to be in the center of the longitudinal slot 54 (Fig. 7). This corresponds to the neutral position of the gears. Push down on the lever 51 until the pin 61 enters the branch 55. This causes a corresponding push throughout the whole length of the selecting rod and causes the selecting arm 62 to move over toward the right (Figs. 1, 3 and 4) until the head 65 makes complete engagement with the shoulder 31 of the primary shifting rod 24. Turn the shifting lever 51 toward the right. This causes the selecting rod 40 to turn back in the direction of the arrow A (Figs. 1 and 3). The resultant forward pull on the primary rod 24 causes the fork 26 to shift the primary gear 14 into mesh with the low speed gear 17. The resultant drive through the main gear 13, countershaft drive gear 22, counter shaft 21, gear 17, primary gear 14 and transmission shaft 10 causes the vehicle to move at low speed.

For reverse: Rotate the lever 51 toward the left. This causes the rod 40 to rotate in the direction of the arrow B so that the arm 62 moves the shifting rod 24 rearward toward the observer in Fig. 1. The fork 26 consequently moves the primary gear 14 into engagement with the reversing pinion 16. The recess 57 (Fig. 7) is occupied by the pin 61 when the lever 51 is moved toward the right and by the recess 58 when the lever is moved toward the left.

For second or intermediate speed: Pull the lever 51 upward so that the pin 61 enters the branch 56. This causes the selecting arm 62 to move toward the left so that it engages the shoulder 32 and is in position to operate in conjunction with the secondary shifting rod 25. The primary shifting rod 24 is now entirely free. Rotate the lever 51 to the left. This causes the selecting rod 40 to rotate in the direction of the arrow B whereupon the rod 25 moves rearward causing the forks 28 to carry the secondary gear 15 into engagement with the second speed gear 18 on the countershaft 21. The pin 61 will then rest in the recess 60.

For third or high speed: Move the shifting lever 51 toward the right so that the pin 61 enters the recess 59 (Fig. 7). This causes the selecting rod 40 to move in the direction of the arrow A. The selecting arm 35 thereupon moves the rod 25 forward so that the fork 28 brings the dogs 19 (Fig. 2) into engagement with the dogs 20 on the main drive gear 13. The transmission shaft 10 is therefore coupled directly to the engine shaft 7, and full engine speed results at the drive shaft 12.

In any case, the springs 66 and 67 (Fig. 3) tend to function to return the selecting arm 62 to a mid-position not only in reference to the transverse dimension of the clutch housing 5 but also in reference to the longitudinal dimension. When the pin 61 is in neutral position, namely, in the middle of the shaft 54 (Fig. 7), the shifting lever 51 cannot be rotated, thereby insuring against a cross or double selection of gears.

Attention is directed to the three diagrams at the bottom of sheet 2. The arrangement in Fig. 8 is identical with that in the preferred arrangement illustrated in the preceding views. Here the axis of rotation of the selecting arm 62 is above the shifting rods 24 and 25 of which only the former is shown in this particular instance.

In Fig. 9 the axis of rotation 40$^a$ is situated beneath the shifting rod. The reader can readily understand that with an arrangement such as this, the movements of the shifting lever 51 would be opposite to that described in connection with the arrangement in Fig. 8. In both Figs. 8 and 9 the selecting arm is situated in the clutch housing.

In Fig. 10 the shifting arm 62$^b$ is situated in the gear housing. The axis of rotation 40ᵇ is situated above the shifting rods. Contact of the selecting arm 62ᵇ is made at a place between the forks 26ᶜ and 28ᶜ. The rotation of the shifting lever for operating the selecting arm 62ᵇ in Fig. 10 would be the same as that described for the arrangement in Fig. 8 and the preferred form of the invention. There is no particular virtue in the specific location of the selecting arm 62 for this arm may be made to work at a place even in the rear of the transmission case 1, the only requirement being that the shifting rod must extend out far enough to permit application of the shoulders 31 and 32.

The modification in Fig. 11 illustrates the provision of a support 65 upon which the shifting lever 51ᵇ is pivotally mounted at 66. This support in turn has a swivel mounting 67 on the guide 48ᵇ. The selecting rod 41ᵇ has a ball end 68 which is received by the socket 69 of the shifting lever. A pin 70, which passes completely through both the socket and the upper end of the selecting rod, serves to keep the lever in place on the rod.

In operation, a downward or upward pressure on the extreme end of the selecting lever will cause the selecting rod 41ᵇ to move reversely, the support 65 furnishing the fulcrum upon which the lever rocks. Having moved the pin 61ᵇ to the desired slot in the guide 48ᵇ, the operator may turn the rod 41ᵇ in one or the other direction, in this case both the lever 51ᵇ and support 65ᵇ moving as one. The lever causes the rod 41ᵇ to turn through the medium of the pin 70 which makes the through connection mentioned before.

While the construction and arrangement of the improved gear controller as herein described and claimed, is that of a generally preferred form, obviously modifications and changes may be made without departing from the spirit of the invention or the scope of the claims.

I claim:

1. A gear controller comprising a selecting rod, bushings in which a portion of the rod has bearing to slide and turn in respect to a shifting rod, a selecting arm fixedly carried by said rod, a shoulder carried by the shifting rod with which said arm is adapted to engage, a guide through which another part of the selecting rod extends said guide having a longitudinal slot and a connected branch slot the ends of which terminate in recesses, a pin carried by the selecting rod working in said slots, and a shifting lever carried by the selecting rod being adapted to move the selecting rod axially so that the pin moves toward said branch slot then turn the rod so that the pin enters in either recess, said moving and turning of the shifting lever correspondingly sliding the arm toward said shoulder then rocking the arm to shift the shifting rod.

2. A gear controller comprising a selecting rod, bushings in which a portion of the rod has bearing to slide and turn in respect to a shifting rod, a selecting arm carried by said rod, a shoulder carried by the shifting rod with which said arm is adapted to engage, a guide through which another part of the selecting rod extends said guide having a longitudinal slot and a connected branch slot the ends of which terminate in recesses, a pin carried by the selecting rod working in said slots, a shifting lever carried by the selecting rod being adapted to move the selecting rod axially so that the pin moves toward said branch slot then turn the rod so that the pin enters either recess, said moving and turning of the shifting lever correspondingly sliding the arm toward said shoulder then rocking the arm to shift the shifting rod, and means in connection with the selecting arm against which the movements of the arm are accomplished said means being adapted to return the arm to a predetermined position in respect to the shifting rod.

3. A gear controller comprising a selecting rod, a yieldable connection in said rod forming a part thereof being adapted to take the rod around bends, clamp means by which said yieldable connection is fastened to the adjacent ends of the rod, a guide to support said yieldable connection, means by which one end of the selecting rod is slidably and turnably mounted in respect to the shifting rod, an arm extending from the selecting rod, a shoulder carried by the shifting rod with which said arm is adapted to engage, a guide through which the other end of the selecting rod extends said guide having an arrangement of longitudinal and branch slots the latter terminating in recesses at the ends, a pin carried by the selecting rod situated to move in said slots, and a shifting lever carried by said rod being adapted to move and turn the rod in respect to the guide and said pin in respect to said slots to correspondingly slide and turn the other end of the rod so that the arm first engages the shoulder then shifts the shifting rod.

4. In combination with the steering post, transmission case and shifting rods of a motor vehicle, a selecting rod extending from the steering post into the transmission case, a combined clamp and guide by which the upper end of the rod is supported on the steering post, said guide having an H-slot consisting of a longitudinal portion and two branch portions the ends of which terminate in recesses, a pin carried by the rod adapted to occupy the longitudinal portion of the slot to prevent turning of the rod, a lever on the rod by which it may be pushed down or pulled up to bring the pin into registration with either branch slot then turned either to the right or left to bring the pin into engagement with any one recess, a selecting arm carried by the lower end of the selecting rod, and a shoulder carried by each shifting rod with either one of which said arm is adapted to be engaged by pushing or pulling the rod and by which either shifting rod is shifted upon turning the selecting arm in one or the other direction according to the turning of the lever.

5. In combination with the steering post, transmission case and shifting rods of a motor vehicle, a selecting rod extending from the steering post into the transmission case, a combined clamp and guide by which the upper end of the rod is supported on the steering post, said guide having an H-slot consisting of a longitudinal portion and two branch portions the ends of which terminate in recesses, a pin carried by the rod adapted to occupy the longitudinal portion of the slot to prevent turning of the rod, a lever on the rod by which it may be pushed down or pulled up to bring the pin into registration with either branch slot then turned either to the right or left to bring the pin into engagement with any one recess, a selecting arm carried by the lower end of the selecting rod, a shoulder carried by each shifting rod with either one of which said arm is adapted to be engaged by pushing or pulling the rod and by which either shifting rod is shifted upon turning the selecting arm in one or the other direction according to the turning of the lever, and springs connected to opposite sides of the selecting arm tending to resist both the sliding and turning movements of the arms.

6. In combination with the steering post, transmission case and shifting rods of a motor vehicle, a selecting rod extending from the steering post into the transmission case, a combined clamp and guide by which the upper end of the rod is supported on the steering post, said guide having an H-slot consisting of a longitudinal portion and two branch portions the ends of which terminate in recesses, a pin carried by the rod adapted to occupy the longitudinal portion of the slot to prevent turning of the rod, a lever on the rod by which it may be pushed down or pulled up to bring the pin into registration with either branch slot then turned either to the right or left to bring the pin into engagement with any one recess, a selecting arm carried by the lower end of the selecting rod, a shoulder carried by each shifting rod with either one of which said arm is adapted to be engaged by pushing or pulling the rod and by which either shifting rod is shifted upon turning the selecting arm in one or the other direction according to the turning of the lever, springs connected to opposite sides of the selecting arm tending to resist both the sliding and turning movements of the arms, and means by which the tension of said springs may individually be adjusted.

7. In a device of the character described, a selecting rod, a housing through which the rod passes, a lever movably attached to the rod, a support upon which the lever is pivoted permitting an up and down movement of the rod upon rocking the lever, and means by which the support is furnished a swivel mounting on the guide to permit turning of the support when the lever and rod are turned.

8. A gear controller comprising a selecting rod, bearings means supporting it for both sliding and turning movement in a transmission case, a pair of gear shifting rods in said case, a selecting arm on the rod extending between said shifting rods, a shoulder on each shifting rod, and springs attached to opposite sides of the selecting arm keeping said arm centered between the shoulders as regards both the sliding and turning movement of the selecting rod.

9. A gear controller comprising a selecting rod, bearing means supporting it for both sliding and turning movement in a transmission case, a pair of gear shifting rods in said case, a selecting arm on the rod extending between said gear shifting rods, a shoulder on each shifting rod, and springs attached to opposite sides of the selecting arm keeping said arm centered between the shoulders as regards both the sliding and turning movement of the selecting rod, and means to which the other ends of the springs are attached adjustable on said transmission case to vary the tension of said springs and maintain the centering function.

10. A gear controller comprising a selecting rod in a plurality of sections each at an angle to the other, a flexible elbow to connect the sections, couplings to fasten the ends of the sections to those of the elbow, means on one of the sections by which the selecting rod is either reciprocated or turned, and a guide by which the elbow is supported during said movements.

11. In combination with the shifting rods of a transmission case, a slidable and turnable selecting rod, an arm extending from said rod to a place between the shifting rods, a shoulder fixed on each of the rods in confronting positions, said shoulders being forked to make room for the end of the arm, and springs attached to opposite sides of the arm to keep it centered in said forks.

12. In combination with the steering post, transmission case and shifting rods of a motor vehicle, a single selecting rod extending from the steering post to the transmission case and composed of several members to conform to different positions of the post and case, flexible means joining the members to take around bends, a slotted and recessed guide clamped upon the steering post on the outside in which guide the upper member is movable, a lever on said member by which, upon appropriate movement, the entire selecting rod is either turned or reciprocated, a pin on said upper member which then traverses said slot and rests in a selected recess to lock the selected rod in position, and a selecting arm on that member in the case by which the shifting rods are actuated according to the manipulation of the lever.

JAMES CLARENCE McDOWELL.